United States Patent
Alexander et al.

(10) Patent No.: US 9,292,443 B2
(45) Date of Patent: Mar. 22, 2016

(54) MULTILEVEL CACHE SYSTEM

(71) Applicant: INTERNATIONAL BUSINESS MACHINES CORPORATION, Armonk, NY (US)

(72) Inventors: Khary J. Alexander, Poughkeepsie, NY (US); Christian Jacobi, Poughkeepsie, NY (US); Martin Recktenwald, Schonaich (DE); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

(21) Appl. No.: 13/927,322

(22) Filed: Jun. 26, 2013

(65) Prior Publication Data

US 2013/0346697 A1  Dec. 26, 2013

(30) Foreign Application Priority Data

Jun. 26, 2012 (GB) .................................. 1211273.6

(51) Int. Cl.
*G06F 12/08* (2006.01)

(52) U.S. Cl.
CPC ........ *G06F 12/0811* (2013.01); *G06F 12/0815* (2013.01); *G06F 12/0862* (2013.01)

(58) Field of Classification Search
CPC .............. G06F 12/0811; G06F 12/084; G06F 12/0815; G06F 12/0897; G06F 12/0817; G06F 11/0724; G06F 12/0802; G06F 12/0862; G06F 12/012; G06F 12/08621
See application file for complete search history.

(56) References Cited

U.S. PATENT DOCUMENTS

| | | | |
|---|---|---|---|
| 5,963,978 A * | 10/1999 | Feiste | 711/158 |
| 6,052,760 A * | 4/2000 | Bauman et al. | 711/119 |
| 6,330,643 B1 | 12/2001 | Arimilli et al. | |
| 6,460,115 B1 | 10/2002 | Kahle et al. | |
| 7,543,112 B1 * | 6/2009 | Chou et al. | 711/118 |
| 2007/0083717 A1 | 4/2007 | Rajamony et al. | |
| 2008/0082756 A1 | 4/2008 | Shen | |

FOREIGN PATENT DOCUMENTS

EP 0743601 A2 11/1996

OTHER PUBLICATIONS

"z/Architecture—Principles of Operation," IBM Publication No. SA22-7832-08, 9th Edition, Aug. 2010, pp. 1-1496.

* cited by examiner

*Primary Examiner* — Hashem Farrokh
(74) *Attorney, Agent, or Firm* — Margaret McNamara, Esq.; Blanche E. Schiller, Esq.; Heslin Rothenberg Farley & Mesiti P.C.

(57) ABSTRACT

Fetching a cache line into a plurality of caches of a multilevel cache system. The multilevel cache system includes at least a first cache, a second cache on a next higher level and a memory, the first cache being arranged to hold a subset of information of the second cache, the second cache being arranged to hold a subset of information of a next higher level cache or memory if no higher level cache exists. A fetch request is sent from one cache to the next cache in the multilevel cache system. The cache line is fetched in a particular state into one of the caches, and in another state into at least one of the other caches.

20 Claims, 4 Drawing Sheets

MULTILEVEL CACHE SYSTEM

PRIOR FOREIGN APPLICATION

This application claims priority from United Kingdom patent application number 1211273.6, filed Jun. 26, 2012, which is hereby incorporated herein by reference in its entirety.

BACKGROUND

One or more aspects relate in general to data processing systems, and in particular, to fetching a cache line into a plurality of caches of a multilevel cache system.

A high-speed memory is sometimes used to increase the speed of processing within a data processing system by making current programs and data available to a processor or central processing unit ("CPU") at a rapid rate. Such a high-speed memory is known as a cache and is sometimes employed in computer systems to compensate for the speed difference between main memory access time and processor logic. Processor logic is usually faster than main memory access with a result that processing speed is mostly limited by the speed of main memory. A technique used to compensate for the mismatch in operating speeds is to employ one or more faster, small memory arrays between the CPU and main memory whose access time is close to processor logic propagation delays. It is used to store segments of programs currently being executed in the CPU and temporary data frequently requested for the present calculations. By making programs (instructions) and data available at a rapid rate, it is possible to increase the performance rate of the processor.

Analysis of programs has shown that the references to memory at a given interval of time tend to be confined within a few localized areas in memory. This phenomenon is known as the property of "locality of reference." The reason for this property may be understood considering that a typical computer program flows in a straight-line fashion with program loops and subroutine calls encountered frequently. When a program loop is executed, the CPU repeatedly refers to the set of instructions in memory that constitute the loop. Every time a given subroutine is called, its set of instructions is fetched from memory. Thus, loops and subroutines tend to localize the reference to memory for fetching instructions. To a lesser degree, memory references to data also tend to be localized. Table look-up procedures repeatedly refer to that portion in memory where the table is stored. Iterative procedures refer to common memory locations and arrays of numbers are confined within a local portion of memory. The result of all these observations is the locality of reference property, which states that, over a short interval of time, the addresses of instructions generated by a typical program refer to a few localized areas of memory repeatedly while the remainder of memory is accessed relatively infrequently.

If the active portions of the program and data are placed in a fast small memory such as a cache, the average memory access time can be reduced, thus reducing the total execution time of the program. The cache memory access time is less than the access time of main memory often by a factor of five to ten, in very large systems it can even reach a factor of 50 or more. The cache, being part of the memory of a computer system as is the main memory, is the fastest component in the memory hierarchy and approaches the speed of CPU components.

A cache line is defined as the smallest data unit administrated in a cache. It is a copy of a memory area with succeeding addresses.

The access of a cache to a CPU or a memory is executed via a single block transfer. A cache line usually covers e.g. 8 to 256 bytes.

The fundamental idea of cache organization is that by keeping the most frequently accessed instructions and data in one or more cache memory arrays, the average memory access time will approach the access time of the cache. Although the cache is only a small fraction of the size of main memory, a larger fraction of memory requests will be found in the cache memory because of the locality of reference property of programs.

The basic operation of the cache is as follows. When the CPU needs to access memory, e.g., for fetching a word, first the cache is examined. If the word is found in the cache, it is read from the cache. If the word requested by the CPU is not found in the cache, the main memory is accessed to read the word. A block of words containing the one word just accessed is then transferred (prefetched) from the main memory to the cache. In this manner, some data is transferred to the cache so that future references to memory find the requested word in the cache.

The average memory access time of the computer system can be improved considerably by use of a cache. The performance of cache memory is frequently measured in terms of a quantity called "hit ratio." When the CPU refers to memory and finds the word in cache, it is said to produce a "hit." If the word is not found in cache, then it is in main memory and it counts as a "miss." If the hit ratio is high enough so that most of the time the CPU finds the requested word in the cache instead of the main memory, the average access time is closer to the access time of the fast cache memory.

For example, a computer with a cache access time of 10 nanoseconds (ns), a main memory access time of 300 ns, and a hit ratio of 0.9 produces an average access time of 39 ns. This is a considerable improvement over a similar computer without a cache memory, whose access time is 300 ns.

In modern microprocessors, the processor cycle time continues to improve with technology evolution. Also, design techniques of speculative execution, deeper pipelines, more execution elements and the like continue to improve the performance of the microprocessor. The improved performance puts a heavier burden on the memory interface since the processors demand more data and instructions from memory to feed the microprocessor. On-chip caches, i.e. caches which are arranged jointly on one common chip, are implemented to help reduce the memory latency, and they are often augmented by larger off-chip caches, i.e. caches which are arranged separately from the chip on which the other caches are jointly arranged. For instance, there may be systems having one or more of L1, L2, L3 caches on-chip and L4 cache off-chip.

Prefetching techniques are often implemented to try to supply memory data to the L1 cache ahead of time to reduce latency. Ideally, a program would prefetch data and instructions far enough in advance that a copy of the memory data would always be in the L1 cache when it was needed by the processor.

BRIEF SUMMARY

Described herein is one aspect of a method for fetching a cache line into a plurality of caches of a multilevel cache system, providing a faster access to the cache line later on. Further, one or more aspects provide a system and computer program product for fetching a cache line into a plurality of caches of a multilevel cache system.

According to one aspect, a method for fetching a cache line into a plurality of caches of a multilevel cache system is provided. The multilevel cache system includes at least a first cache, a second cache on a next higher level and a memory, the first cache being arranged to hold a subset of information of the second cache, the second cache being arranged to hold a subset of information of a next higher level cache or memory if no higher level cache is present, and the method includes sending a fetch request from one cache to the next higher level cache in the multilevel cache system; based on the fetch request, fetching the cache line in a particular state into one of the caches; and based on the fetch request, fetching the cache line in another state into at least one of the other caches, wherein the particular state is a different state than the another state.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

DETAILED DESCRIPTION

Figure 1:
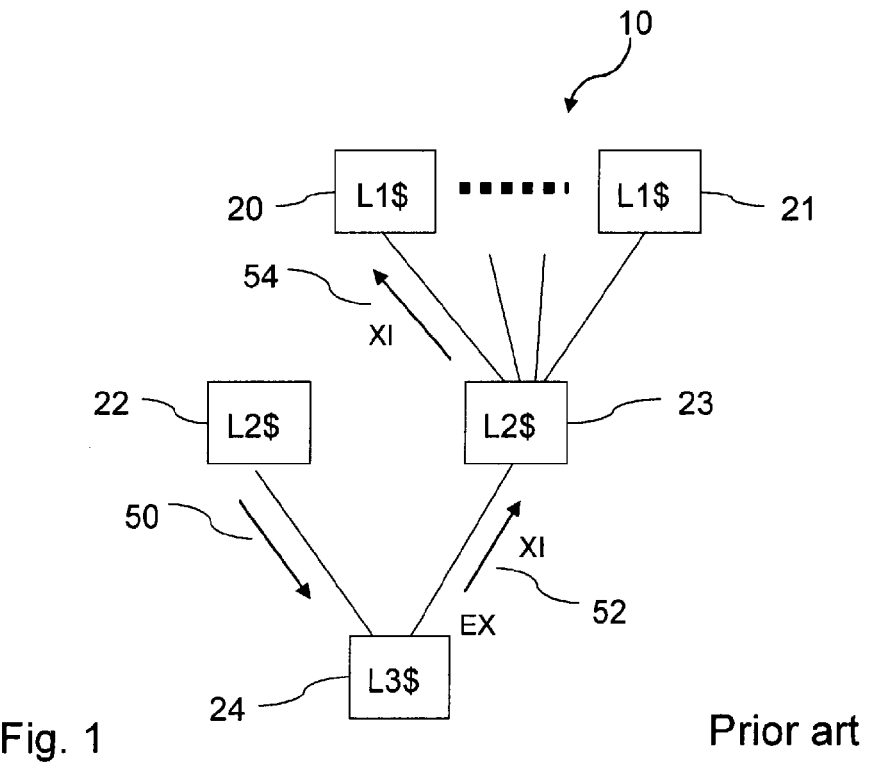
FIG. 1 an example of a process of fetching a cache line in a multilevel cache system according to prior art.

One of the problems with existing prefetching mechanisms is that they operate on one cache level or one prefetch buffer. With ever increasing memory latencies associated with increasing processor speeds, a prefetch mechanism that operates on multiple cache levels is required.

U.S. Pat. No. 6,460,115 B1, hereby incorporated herein by reference in its entirety, discloses to provide a centralized hardware prefetch mechanism, which treats the first (L1), second (L2), or third level (L3) cache levels as a three-level prefetch buffer, appropriately compensating for the different latencies and block sizes of each cache level.

A private prefetching bus is used to carry extra prefetch requests made to the secondary L2 cache. The result is that prefetching for the higher numbered cache levels in a memory hierarchy within a multilevel cache system is performed without burdening the data busses with such prefetch traffic.

The prefetch mechanism is implemented in a multiprocessor environment whereby two processor cores share an L2 cache. Each processor core implements a prefetcher mechanism for controlling prefetching of data into the first (L1), second (L2), or third level (L3) caches. Prefetching to the second and third level caches is performed by signaling the second level cache over a private (dedicated) prefetch bus.

A state of the art multilevel cache system may be described as a tree hierarchy structure. A cache line may have three states in every cache: read-only, exclusive, or not-owned. In this context a read-only flag or read-only ownership indicates that the cache line can be shared between multiple caches, and no stores can be done to a read-only owned cache line, while exclusive ownership can be given only to one cache at a particular cache level, and exclusive ownership of a cache line is required to store to the cache line. A cache line is said to be "in the cache" if it is either in a state with a read-only or exclusive flag. In "inclusive cache hierarchies", if a cache line is with a read-only flag in a particular cache, it is also in all cache levels above (in a state with a read-only or exclusive flag), and if the cache line is with an exclusive flag in a cache, it is also with an exclusive flag in all cache levels above. If a cache line is owned with an exclusive flag at some level, it cannot be owned with a read-only or exclusive flag by any other cache on that same level. In other words: only one leaf of the tree hierarchy can own the cache line with an exclusive flag, and due to the "inclusive cache" property, all caches from that leaf to the root of the tree hierarchy have the cache line with an exclusive flag, and no other cache in the entire tree has the cache line with a read-only or exclusive flag.

In the drawings, like elements are referred to with equal reference numerals. The drawings are merely schematic representations, not intended to portray specific parameters of aspects of the invention. Moreover, the drawings are intended to depict only typical embodiments of aspects of the invention, and therefore, should not be considered as limiting the scope of aspects of the invention.

In FIG. 1 an example of a process of fetching a cache line in a multilevel cache system 10 having a tree hierarchy according to prior art is described. In this example the tree hierarchy of the multilevel cache system 10 is very simple. Level 3 of the hierarchy has only one member 24. Level 2 has two members 22, 23. Level 1 has n members 20, ..., 21. Level 1 is here the lowest level, and level 3 is the highest level.

If a cache line is owned by a cache in a particular state, namely with an exclusive flag at some level, it cannot be owned with a read-only flag or an exclusive flag by any other cache on that same level.

If a lower-level cache, e.g. the first cache L1, receives a request for a cache line and the request misses (either because the request is for a cache line that is not in the cache at all, or because the request is for an exclusive flag, but the cache line is only present in that cache in the particular state with a read-only flag), a request for obtaining the cache line in the appropriate state is sent to the next higher-level cache, e.g. from L1 to L2, or from L2 to L3.

If the L3 cache 24 has a cache line in a state with an exclusive flag, labeled "EX" in the drawing, and an L2 cache 22 requests 50 from the L3 cache 24 the cache line in a state with a read-only or exclusive flag, but another L2 cache 23 at the same level already has the cache line with an exclusive flag, a so called "exclusive cross invalidate" request, also referred to with "XI" 52 is sent from the L3 cache 24 to the L2 cache 23; the L2 cache 23 sends the XI request 54 down to its next lower level cache 20 owning the cache line with an exclusive flag, which, as is assumed in the example shown, is the L1 cache 20, and thereby removes the cache line from the subtree of L2 cache 23, which means, from all level 1 caches 20, 21 connected to L2 cache 23. The L2 cache 23 then, as a response to the XI request 52, "accepts" the XI request 52, upon which L3 cache 24 can grant exclusive ownership of the cache line to L2 cache 22.

If the L2 cache 23 has the cache line with a read-only flag, a "read-only XI" request is sent from the L3 cache 24 to the second cache, L2 cache 23, which then removes the cache line from the subtree of L2 cache 23. L3 cache 24 can then grant exclusive ownership of the cache line to L2 cache 22. This process is faster than the case with the L1 cache 20 owning the cache line with an exclusive flag since it is not needed to wait for an "accept" response.

Figure 2:
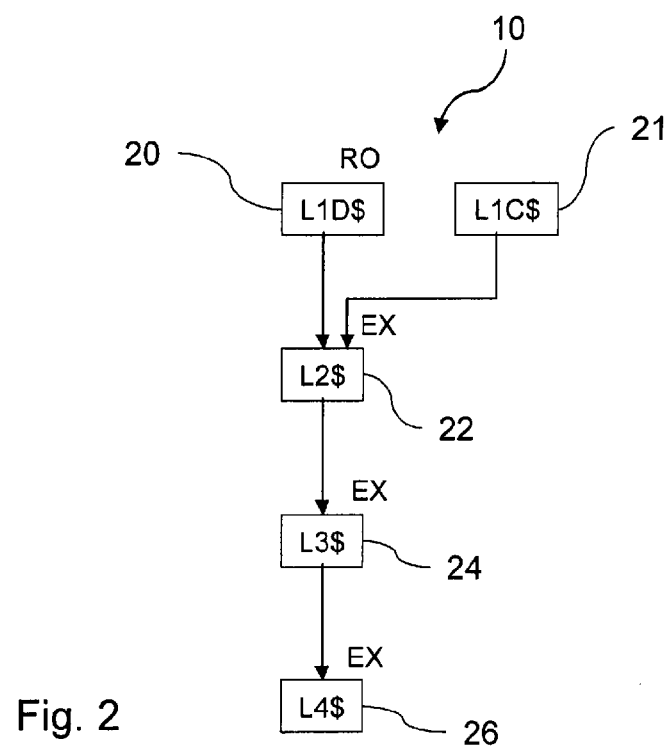
FIG. 2 a process of fetching a cache line in a multilevel cache system according to an embodiment of the invention.

In FIG. 2 an example of the process of fetching a cache line in a multilevel cache system 10 according to embodiment of the invention is shown. In this example the tree hierarchy of the multilevel cache system 10 is relatively simple, consisting of two first caches, L1 cache L1D$ ("data cache") 20 and L1 cache L1C$ ("coprocessor cache") 21 connected to a second cache, L2 (L2$) cache 22, which in turn is connected to a third cache, L3 (L3$) cache 24 and a fourth cache, L4 (L4$) cache 26. According to an aspect of the invention, the method enables to fetch the cache line with a particular state, here a read-only (RO) flag into a first L1 cache, e.g. the L1D$ cache 20, but with another state, here an exclusive flag (EX) into a second cache, an L2 cache 22. Thus, if a coprocessor, e.g., requests an exclusive access to the cache line in its L1C$ cache 21, the L1C$ cache 21 will have a miss, because it does not have the cache line with a read-only flag. Then, in turn, the L1C$ cache 21 will send a fetch request to the next higher level cache, here the L2 cache 22 in order to fetch the cache line with an exclusive flag from L2 cache 22, and since the cache line is present already with an exclusive flag in the L2 cache 22, it is not necessary to access the third cache, the L3 cache 24. The L2 cache 22 will send a read-only XI request to the other L1 cache L1D$ cache 20, which is a faster XI request, and thus more quickly returns the requested cache line with an exclusive flag to the L1C$ cache 21, because it is not necessary to wait for an accept response of the L1D$ cache 20.

Figure 3:
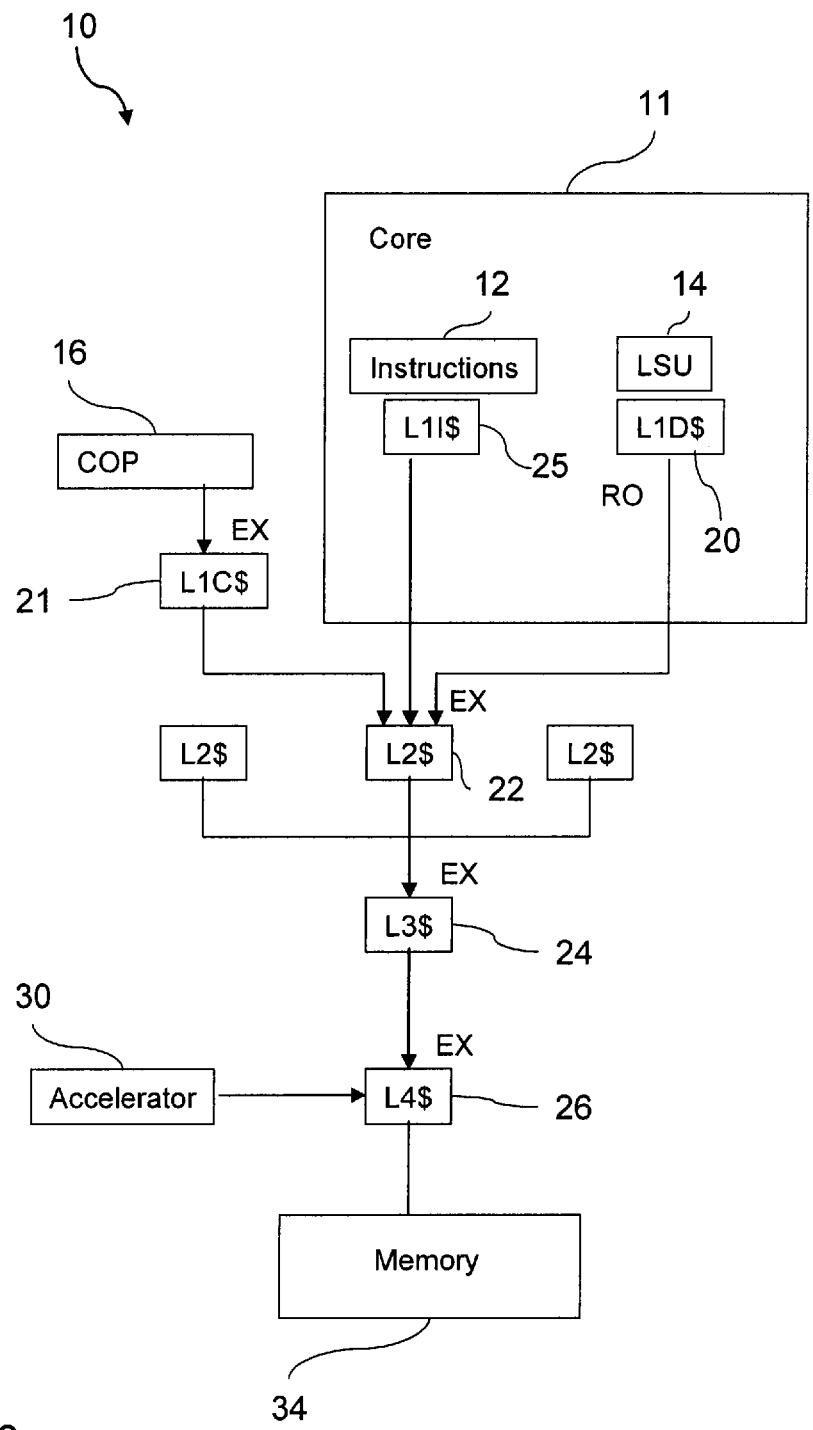
FIG. 3 a multilevel cache system according to an embodiment of the invention.

In FIG. 3 a concept of a multilevel cache system 10 according to an example embodiment of an aspect of the invention is described. In the drawing is shown a schematic sketch of a plurality of L1, L2, L3, L4 caches (also referred to as L1$, L2$, L3$, L4$) arranged on different levels of a tree hierarchy and connecting a CPU 11 with a coprocessor 16, an L4-attached accelerator 30 and a memory 34. The CPU 11 comprises instructions of a data processing program 12 as well as a Load-Store-Unit (LSU) 14 with a separate first cache, L1 cache 25 for instructions and a separate first cache, L1 cache 20 for the LSU 14, respectively. The coprocessor 16 is also connected to a first cache, L1 cache 21, also referred to as coprocessor cache, on the same level L1. The L1 caches 20, 21 and 25 are connected to one (22) of several second caches, L2 caches, which are connected to an L3 cache 24, which is connected to an L4 cache 26, which is both connected to the L4-attached accelerator 30 and the memory 34. All lower level caches may contain subsets of information, that means part of the information stored, from each next higher level cache, respectively, or the memory 34 if no higher level cache is present.

In case, initiated by instructions of the data processing program 12, using a separate cache 25 for handling instructions, there exists a request by the coprocessor 16 to operate on some requested data, an exception checking is performed by the LSU 14 in order to decide if the operation is allowed on the requested data. To enable this exception checking a cache line referring these data shall be loaded to the LSU 14. Applying one or more aspects of the inventive technique, it is possible to load the cache line via a fetch request, which means a request from one cache to the next cache for fetching a cache line into a cache, in a particular state, such as a status with an exclusive flag (EX) into the L4 cache 26, as well as with a particular state having the exclusive flag (EX) into a third cache, the L3 cache 24, as well as with a particular state having the exclusive flag (EX) into a second cache, the L2 cache 22, but with another state such as having a read-only flag (RO) into a first cache, the LSU's L1 cache 20, as is shown in FIG. 3. For exception checking the LSU 14 can use the cache line with a read-only flag. If the exception checking process has a positive result, i.e. the coprocessor 16 is allowed to operate on the requested data, the coprocessor 16 can immediately get the cache line with an exclusive flag in order to start operating on the data. No further delay is introduced by going down and up along the cache levels 22, 24, 26 to get the exclusive flag in the coprocessor cache 21.

Similarly if, initiated by instructions of the data processing program 12, there exists a request by an accelerator 30 to operate on some requested data, an exception checking is performed by the LSU 14 in order to decide if the operation is allowed on the requested data. To enable this exception checking a cache line referring these data shall be loaded to the LSU 14. And in the same way as described above, one or more aspects enable to bring the cache line with an exclusive flag EX into the L4 cache 26, but with a read-only flag RO into the L3, L2 and all L1 caches 24, 22, 20, 21, 25. For exception checking the LSU 14 can use the cache line with a read-only flag. If the exception checking process has a positive result, the accelerator 30, connected to the L4 cache 26, may start executing with e.g., compressing, decompressing or moving data from/to the memory 34, as storing to the cache line without requesting exclusive ownership for the L4 cache 26 again.

Figure 4:
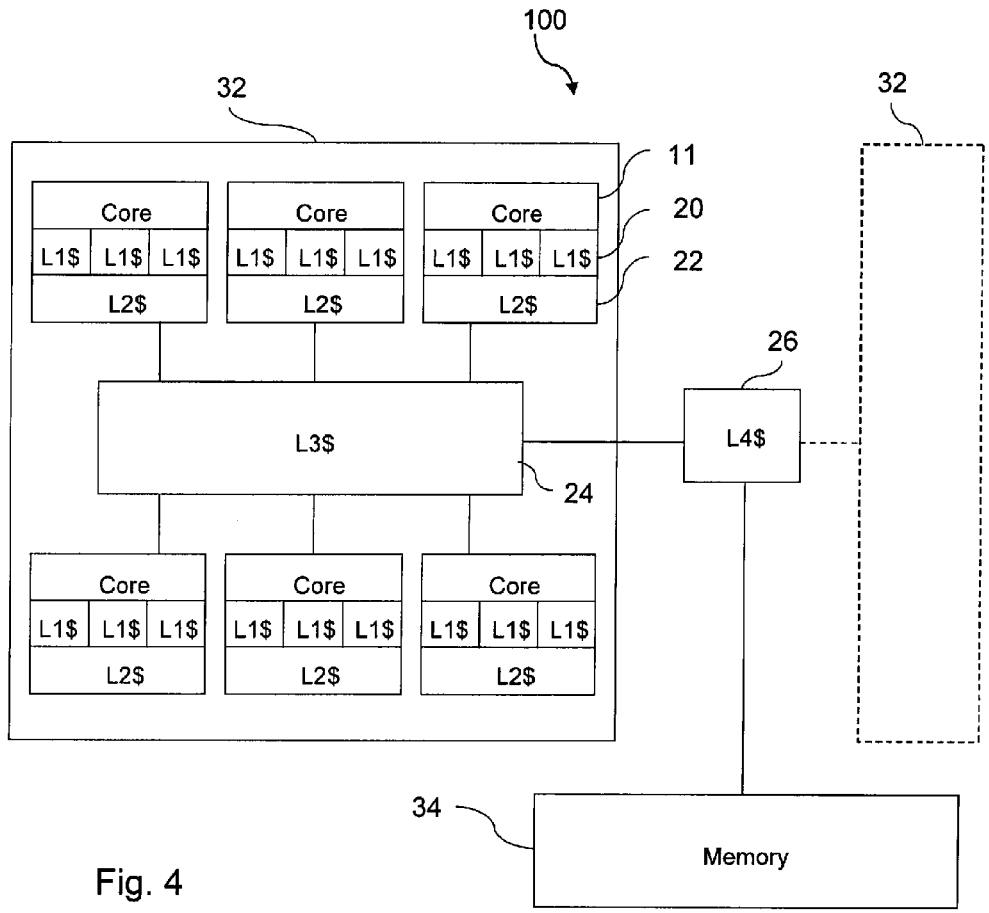
FIG. 4 a data processing system, comprising of a variety of processor chips coupled via a cache according to a further embodiment of the invention.

FIG. 4 shows an example embodiment of a multi processor system 100, comprising a variety of processor chips 32 coupled via an L4 cache 26 according to one or more aspects of the invention. Each processor chip 32 includes different CPUs 11, each of them with several L1 caches 20 and at least one L2 cache 22. The different CPUs 11 on a single processor chip 32 are connected to a common L3 cache 24, which is connected on the other side to an L4 cache 26. This L4 cache 26 serves for interconnecting different processor chips 32 and on the other side is connected to a memory 34. In this tree-like hierarchy of a multilevel cache system the same technique may be applied as described in FIG. 3. If there exists some request by a specific CPU 11 out of the variety of CPUs realized on the different processor chips 32 of the data processing system it is only needed to request a cache line with an exclusive flag down to the level where the requesting processor is working. If the processor which is responsible for exception checking in order to allow an operation on the requested data is on a lower level, this processor only needs the cache line with a read-only flag, and thus, the operation on the requesting processor may start without any further delay after granting the requesting operation.

Figure 5:
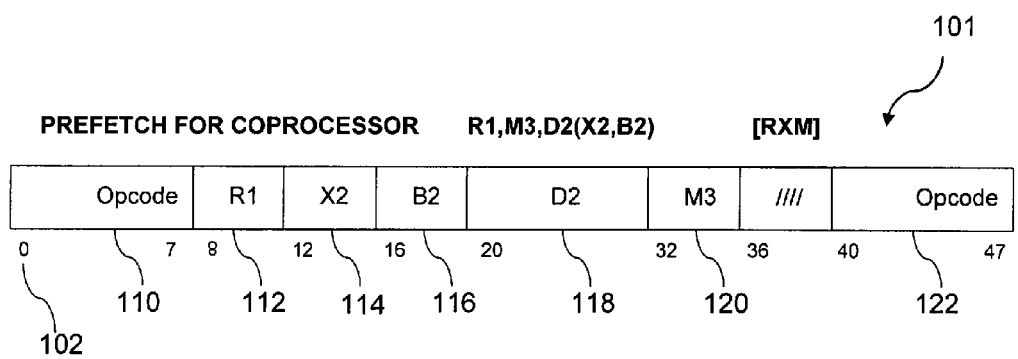
FIG. 5 a sketch of pertinent parts of a definition of an instruction set for an example embodiment of the invention.

FIG. 5 depicts pertinent parts of a definition of an instruction 101 of an instruction set of a CPU 11 implementing one or more aspects of the inventive technique for an example embodiment. In the example it is demonstrated how configuration bits in the instruction 101 encoding may be used for specifying a particular state for a cache line in a particular cache level. In FIG. 5 an instruction word 101 is shown as a sketch with different information fields, below the fields the bit numbers 102 of the instruction word are marked.

An instruction 101 for a Prefetch-For-Coprocessor process is shown. The instruction word 101 is explained with the different information fields Opcode 110, R1 112, X2 114, D2 118, B2 116, M3 120, where these fields follow the general rules described in IBM publication SA22-7832-08 "IBM z/Architecture Principles of Operation," hereby incorporated herein by reference in its entirety, shortly summarized here as:

Opcode 110=Instruction identifier,
R1 112=Destination register,

D2 118=Displacement in storage,
X2 114=Index address register,
B2 116=Base address register,
M3 120=Mask field to select function.

The bits of the M3 mask field 120 determine how the instruction encoding will operate in terms of access exception checking and cache behavior, where bits 0, 2, 3 (in FIG. 5 the bits numbers 102 of the mask field are referred to as bit numbers 32 to 35) have the following functions:

- mask bit 0: Fetch/Store access exception checking When the bit is '0'b the instruction checks for fetch-type access exceptions only, and when the bit is '1'b, it also checks for store-type access exceptions.
- mask bit 2: Fetch data exclusive into L4 cache, but only read-only into L3, L2 and LSU.
- mask bit 3: Fetch data exclusive into L2 cache, but only read-only into LSU. If there are locations in the L2 cache that are better suited for a following access from the coprocessor, fetch the line into such a location (instead of a location that is better suited for LSU accesses).

Thus different settings of the configuration bits of the M3 mask field of the instruction 101 shown, e.g., determine the kind of flag with which data are fetchable on different levels of caches.

Figure 6:
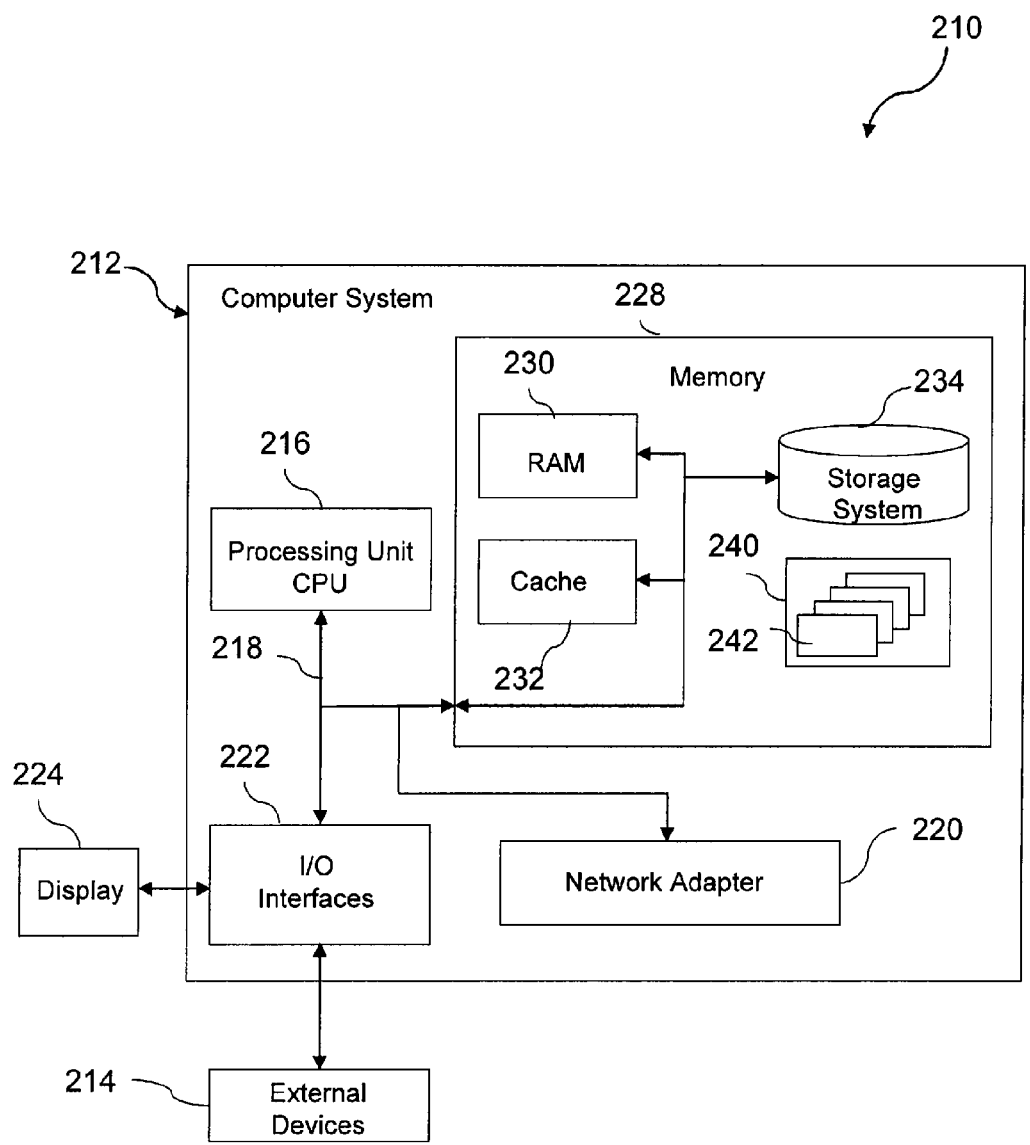
FIG. 6 an example embodiment of a data processing system for carrying out a method according to an aspect of the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of one or more embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of one or more embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, according to one aspect, a method for fetching a cache line into a plurality of caches of a multilevel cache system is provided. The multilevel cache system includes at least a first cache, a second cache on a next higher level and a memory, the first cache being arranged to hold a subset of information of the second cache, the second cache being arranged to hold a subset of information of a next higher level cache or memory if no higher level cache is present, and the method includes sending a fetch request from one cache to the next cache in the multilevel cache system, fetching the cache line into one of the caches in a particular state, which is described herein, and fetching the cache line in another state into at least one of the other caches.

The numbering of the different caches described herein means that they are located on different levels of a relative cache hierarchy. For example, the first cache may be an L1 cache, the second cache may be an L2 cache and the third cache may be an L3 cache. Yet the first cache may also be on L2 level, the second cache on L3 level and the third cache on L4 level. The information each cache is containing, i.e. the cache line, covers a subset of information of the next higher level cache, which means it covers at least part of the information, but it could also be a complete image of the information the next higher level cache is containing. The particular states of a cache line describe the access possibilities for other caches or processors to read or write information from or to a cache. Possible states may be read-only, exclusive or not-owned state. For example, a processor can write to a cache line of a cache, if the cache line is with an exclusive flag, whereas if the cache line is only with a read-only flag, it is only possible to read the information in the cache line but not possible to change it or overwrite it. If the cache line is with a not-owned flag, the information cannot be accessed. If a cache wants to access a cache line in a particular state it may send a request for fetching a cache line or fetch request to another cache or a memory. Depending on the state of the cache line in the other cache the first cache will get the cache line or not.

As examples, the particular state of the cache line is one with a read-only flag or an exclusive flag, because these flags play a role in starting or performing accelerator operations in a data processing system, as is described in detail herein.

Various caches of a multilevel cache system may be connected in some topology, e.g. a tree hierarchy. The leaves of the tree are the L1 caches, one level up are the L2 caches, etc. Of course the topology could be different. Connected to the caches may be CPUs or accelerators, sometimes referred to as coprocessors, which can be used for performing special functions in a data processing system, e.g. accelerating special operations. Accelerators can be connected to L1 or higher level caches.

Such a topology allows in particular for prefetching data based on an L1 prefetcher or a special instruction not (always) directly into an L1 cache, but potentially into an L2 cache or an L3 cache only.

According to one embodiment of the invention, the technique may enable fetching a cache line into one leaf of a multilevel cache system realized as a hierarchy tree, especially fetching it in a way that enables another cache in the tree to have faster access to the cache line later on. For instance, a technique is described that enables performing exception checking for compression and/or decompression and/or cryptographic instructions and bringing the target cache line into a load store unit ("LSU") with a read-only flag, but with an exclusive flag into the L2 cache, so that a coprocessor cache can readily request exclusive ownership from the L2 cache without a subsequent exclusive cache miss from the L2 to the L3 caches. Also since the cache line is with a read-only flag in the LSU, it can be cross invalidated ("XI") easily without waiting for an XI-response. Also, one aspect may be applied to bring in the cache line with a read-only flag into the L1, L2 and L3 caches, but with an exclusive flag into the L4 cache, so that later on an accelerator in the L4 cache can readily remove the cache line from the L1/L2/L3 caches and perform operations that require having the line in an exclusive state (such as storing to the cache line).

According to a further embodiment of the invention, the cache line may be fetched into the first cache, the first cache being arranged to hold a subset of information of the second cache, the second cache being arranged to hold a subset of information of the third cache, comprising sending a fetch request to the second cache, the second cache fetching a cache line from the third cache with an exclusive flag, the third cache returning the cache line to the second cache with an exclusive flag and finally the second cache returning the cache line to the first cache with a read-only flag.

In one embodiment, an operation as exception checking, e.g., requires only a cache line with a read-only flag and if the result of the exception checking process is positive, the required operation as an accelerator operation, e.g., may be started immediately after getting the result. Thus the time interval between getting the result from exception checking and starting the operation may be decreased significantly compared to conventional methods.

As one embodiment, the first cache may be an L1 cache and all other caches may be higher level caches in the multilevel cache system, because checking operations as exception checking, e.g., are commonly performed on L1 caches of a multilevel cache system hierarchy.

According to a further embodiment of the invention, a first cache and at least one other cache of the plurality of caches may occur on the same level in the multilevel cache system. This is an advantage, if data shall be manipulated in processors or accelerators which are connected to caches on the same level of the multilevel cache system as it may be the case for a CPU and some coprocessor of a data processing system.

Favorably, in another embodiment, a cache line may be fetched into at least one cache and/or all other higher level caches of the plurality of caches in a state with an exclusive flag for executing an operation and fetched in a state with a read-only flag into all other caches of the plurality of caches which are on a lower level in the multilevel cache system down to the level where an exception checking is done. This is an advantage, if a process performed on some data shall be started without a significant delay, as no exclusive invalidation request has to be sent. Thus no further feedback from lower level caches is needed in order to start the operation.

According to a further embodiment an instruction of an instruction set of a processor may be used for performing one or more aspects, comprising one or more configuration bits in its instruction encoding that are specifying a particular state for a cache line in a particular cache level. These configuration bits can be used to specify the cache level up to which the cache line should be fetched with an exclusive or read-only flag. This might represent a very efficient and direct way of encoding the needed options.

According to another embodiment of the invention a method step may be included wherein the cache line may be cross invalidated from an entire subtree of a cache which is one level higher in the multilevel cache system than the requesting cache by sending a request for a cache line with an exclusive flag to this cache. In this embodiment, if an L3 cache has a cache line with an exclusive flag, and an L2 cache requests the cache line (with a read-only or exclusive flag), but another cache on the same level has the cache line with an exclusive flag, a so called "exclusive XI" request is sent to the first L2 cache; the L2 cache sends the request down to a lower level cache that owns the cache line with an exclusive flag (if such a lower level cache exists), and thus removes the cache line from the entire subtree of the L2 cache. It then "accepts"

the XI request, upon which the L3 cache can grant exclusive ownership to the first L2 cache. In one embodiment, there is waiting for the accept because there could still be storage updates pending in the second L2 cache that have to be sent to the L3 cache before the cache line is given to the first L2 cache.

If the second L2 cache has the cache line with a read-only flag, a "read-only XI" request is sent to second L2 cache which in turn removes the cache line from the entire subtree; the L3 cache can then grant exclusive ownership to first L2 cache. Because the line was read-only in the second L2 cache, there can be no storage updates pending, so this process is faster because it is not needed to wait for the "accept" response.

According to a further embodiment, a step may be included wherein for performing an accelerator operation including one operation of compression, decompression, move, copy of data, an exception checking of a storage location involved in the accelerator operation may be performed prior to the accelerator operation.

Performing the exception checking according to prior art typically involves fetching some of the cache lines of the operands into an L1 cache, e.g. to receive a memory key in z/Architecture. Then when the accelerator having its own L1 cache starts, the accelerator has a cache miss since the cache line was just loaded into the CPU's L1 right before the accelerator started processing. Therefore, in one embodiment, specifically an instruction is described that allows exception checking for accelerator operations, such as compression and/or decompression and/or cryptographic instructions and brings the target cache line into the CPUs L1 cache (typically the LSU) with a read-only flag, but with an exclusive flag into an L2 cache attached to both the CPUs L1 cache and the accelerator's L1 cache, so that the accelerator's cache can readily request exclusive ownership from the L2 cache without a subsequent exclusive cache miss from the L2 cache to the L3 cache. Also since the cache line is with a read-only flag in the LSU, it can be cross invalidated easily without waiting for a response to an exclusive XI request.

Also, in one embodiment, the cache line is brought in with a read-only flag into the L1, L2 and L3 caches, and with exclusive flag into the L4 cache, so that later on an accelerator connected to the L4 cache can readily remove the cache line from the L1/L2/L3 caches and perform its operation.

In one embodiment, an L4-attached accelerator operation may be started executing by fetching a cache line in a state with a read-only flag into all lower level caches of the plurality of caches of the multilevel cache system on the path to the cache that handles exception checking and fetching the cache line in a state with an exclusive flag into the accelerator connected cache. Thus no further delay is needed in starting the operation after getting the positive response from a lower level exception checking operation to have the allowance to operate on the data.

In a further embodiment, a cache line is fetched in a state with a read-only flag into an LSU for exception checking for performing coprocessor operations, and a cache line is fetched in a state with an exclusive flag into at least one other cache connected to the coprocessor, where this second cache may be positioned on the same level as the first cache. Here, too, there is a delay minimized start of the operation on the data by the coprocessor.

According to a further aspect of the invention, a system for performing a method for fetching a cache line into a plurality of caches of a multilevel cache system is provided, comprising at least a memory for storing data, a processor, a coprocessor, a LSU and a plurality of caches of a multilevel cache system, wherein cache lines are fetchable in a state with a read-only flag into the LSU for exception checking for performing coprocessor operations, whereas cache lines are fetchable in a state with an exclusive flag into at least one other cache connected to the coprocessor.

In a further aspect of the invention a data processing program is provided for execution in a data processing system, comprising an implementation of an instruction set for performing a method as described above when the data processing program is run on a computer.

As a further aspect of the invention an instruction and an implementation of the instruction is provided, that brings in cache lines into a multilevel cache system in a particular state, in order to later on help another cache to quickly access that cache line. In particular the instruction can bring in the cache line in a particular state into one cache, but in another state into all higher level caches.

Further a computer program product comprising a computer usable medium including a computer readable program is provided, wherein the computer readable program when executed on a computer causes the computer to perform a method for fetching a cache line into a plurality of caches of a multilevel cache system, comprising at least a first cache, a second cache and a third cache, the first cache being arranged to hold a subset of information of the second cache, the second cache being arranged to hold a subset of information of the third cache, where the method steps are sending a fetch request from one cache to the next cache in the multilevel cache system, fetching the cache line in a particular state, particularly one with a read-only flag or an exclusive flag into one of the caches and fetching the cache line in another state into at least the second cache.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for performing a method described herein.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method for fetching a cache line into caches of a multilevel cache system, the multilevel cache system comprising at least a first cache, a second cache on a next higher level and a memory, the first cache being arranged to hold a subset of information of the second cache, the second cache being arranged to hold a subset of information of a next higher level cache or memory if no higher level cache is present, the method comprising:
    sending a fetch request from one cache to the next higher level cache in the multilevel cache system;
    based on the fetch request, fetching a cache line into one cache of a plurality of caches of the multilevel cache system, the cache line in the one cache having a particular state; and
    based on the fetch request, fetching the cache line into another cache of the plurality of caches, wherein the cache line in the other cache has another state, the other state being a different state than the particular state.

2. The method according to claim 1, wherein the particular state of the cache line is one with a read-only flag or an exclusive flag.

3. The method according to claim 1, wherein the cache line is fetched into the first cache, the first cache being arranged to hold a subset of information of the second cache, the second cache being arranged to hold a subset of information of a third cache, and wherein the method further comprises:
    sending the fetch request to the second cache;
    the second cache fetching the cache line from the third cache with an exclusive flag;
    the third cache returning the cache line to the second cache with the exclusive flag; and
    the second cache returning the cache line to the first cache with a read-only flag.

4. The method according to claim 1, wherein the first cache is a level 1 cache and the other caches of the plurality of caches are higher level caches in the multilevel cache system.

5. The method according to claim 1, wherein the first cache and at least one other cache of the plurality of caches are on the same level in the multilevel cache system.

6. The method according to claim 1, wherein the cache line is fetched into at least one higher level cache of the plurality of caches, wherein the cache line in the at least one higher level cache has a state with an exclusive flag for executing an operation, and wherein the cache line is fetched into other caches of the plurality of caches which are on a lower level in the multilevel cache system, and the cache line in the other caches has a state with a read-only flag.

7. The method according to claim 1, wherein an instruction of an instruction set of a central processing unit is used to fetch the cache line, the instruction comprising one or more configuration bits in its instruction encoding to specify a defined state for the cache line in a specific cache level.

8. The method according to claim 1, wherein the cache line is cross invalidated from a subtree of a cache which is one level higher in the multilevel cache system than a requesting cache by sending a fetch request for the cache line with an exclusive flag to the cache which is one level higher.

9. The method according to claim 1, further comprising performing an accelerator operation, including one of compression, decompression, move, or copy of data, and wherein an exception checking of a storage location involved in the accelerator operation is performed prior to the accelerator operation.

10. The method according to claim 9, wherein the accelerator operation starts executing by fetching a selected cache line into lower level caches of the plurality of caches of the multilevel cache system, the selected cache line in the lower level caches having a state with a read-only flag, and fetching the selected cache line into an accelerator connected cache, wherein the selected cache line in the accelerator connected cache has a state with an exclusive flag.

11. The method according to claim 1, further comprising:
fetching a cache line into a load store unit for exception checking for performing coprocessor operations, wherein the cache line in the load store unit has a state with a read-only flag; and
fetching a cache line into at least one other cache connected to the coprocessor, wherein the cache line in the at least one other cache connected to the coprocessor has a state with an exclusive flag.

12. A computer system for fetching a cache line into caches of a multilevel cache system, the multilevel cache system comprising at least a first cache, a second cache on a next higher level and a memory, the first cache being arranged to hold a subset of information of the second cache, the second cache being arranged to hold a subset of information of a next higher level cache or memory if no higher level cache is present, the computer system comprising:
a processor in communications with the multilevel cache system, wherein the computer system is configured to perform a method, said method comprising:
sending a fetch request from one cache to the next higher level cache in the multilevel cache system;
based on the fetch request, fetching a cache line into one cache of a plurality of caches of the multilevel cache system, the cache line having a particular state; and
based on the fetch request, fetching the cache line into another cache of the plurality of caches, wherein the cache line in the other cache has another state, the other state being a different state than the particular state.

13. The computer system according to claim 12, wherein the cache line is fetched into the first cache, the first cache being arranged to hold a subset of information of the second cache, the second cache being arranged to hold a subset of information of a third cache, and wherein the method further comprises:
sending the fetch request to the second cache;
the second cache fetching the cache line from the third cache with an exclusive flag;
the third cache returning the cache line to the second cache with the exclusive flag; and
the second cache returning the cache line to the first cache with a read-only flag.

14. The computer system according to claim 12, wherein the cache line is fetched into at least one higher level cache of the plurality of caches, wherein the cache line in the at least one higher level cache has a state with an exclusive flag for executing an operation, and wherein the cache line is fetched into other caches of the plurality of caches which are on a lower level in the multilevel cache system, and the cache line in the other caches has a state with a read-only flag.

15. The computer system according to claim 12, wherein an instruction of an instruction set of a central processing unit is used to fetch the cache line, the instruction comprising one or more configuration bits in its instruction encoding to specify a defined state for the cache line in a specific cache level.

16. A computer program product for fetching a cache line into caches of a multilevel cache system, the multilevel cache system comprising at least a first cache, a second cache on a next higher level and a memory, the first cache being arranged to hold a subset of information of the second cache, the second cache being arranged to hold a subset of information of a next higher level cache or memory if no higher level cache is present, and the computer program product comprising:
a non-transitory computer readable storage medium readable by a processing circuit and storing instructions for execution by the processing circuit for performing a method comprising:
sending a fetch request from one cache to the next higher level cache in the multilevel cache system;
based on the fetch request, fetching a cache line into one cache of a plurality of caches of the multilevel cache system, the cache line fetched into the one cache having a particular state; and
based on the fetch request, fetching the cache line into another cache of the plurality of caches, wherein the cache line in the other cache has another state, the other state being a different state than the particular state.

17. The computer program product according to claim 16, wherein the cache line is fetched into the first cache, the first cache being arranged to hold a subset of information of the second cache, the second cache being arranged to hold a subset of information of a third cache, and wherein the method further comprises:
sending the fetch request to the second cache;
the second cache fetching the cache line from the third cache with an exclusive flag;
the third cache returning the cache line to the second cache with the exclusive flag; and
the second cache returning the cache line to the first cache with a read-only flag.

18. The computer program product according to claim 16, wherein the cache line is fetched into at least one higher level cache of the plurality of caches, wherein the cache line in the at least one higher level cache has a state with an exclusive flag for executing an operation, and wherein the cache line is fetched into other caches of the plurality of caches which are on a lower level in the multilevel cache system, and the cache line in the other caches has a state with a read-only flag.

19. The computer program product according to claim 16, wherein an instruction of an instruction set of a central processing unit is used to fetch the cache line, the instruction comprising one or more configuration bits in its instruction encoding to specify a defined state for the cache line in a specific cache level.

20. The computer program product according to claim 16, wherein the method further comprises performing an accelerator operation, including one of compression, decompression, move, copy of data, wherein an exception checking of a storage location involved in the accelerator operation is performed prior to the accelerator operation.

\* \* \* \* \*